United States Patent [19]

Rhodes

[11] 4,366,965
[45] Jan. 4, 1983

[54] GLADHAND AND PLUG KEEPER FOR TRUCKS

[76] Inventor: Murray G. Rhodes, 110 Stanton Lake, Leesburg, Ind. 46538

[21] Appl. No.: 188,809

[22] Filed: Sep. 19, 1980

[51] Int. Cl.³ .............................................. B60D 7/04
[52] U.S. Cl. .................................. 280/421; 137/351; 248/75; 339/10
[58] Field of Search ....................... 280/420, 421, 422; 137/351, 354, 355, 355.16, 355.17; 248/75; 285/23, 62; 339/10, 15, 119 L, 121; 213/76, 1.3, 1 R

[56] References Cited

U.S. PATENT DOCUMENTS

| | | | |
|---|---|---|---|
| 2,733,033 | 1/1956 | Gunderson | 280/421 X |
| 3,176,257 | 3/1965 | Introvigne | 280/421 X |
| 3,210,116 | 10/1965 | Chieger | 280/420 X |
| 4,092,034 | 5/1978 | Becker | 280/420 |

FOREIGN PATENT DOCUMENTS

| | | | |
|---|---|---|---|
| 68846 | 2/1943 | Norway | 280/421 |
| 70923 | 11/1948 | Norway | 280/421 |

Primary Examiner—John A. Pekar
Attorney, Agent, or Firm—Reising, Ethington, Barnard, Perry & Brooks

[57] ABSTRACT

A keeper (10) is adapted for installation on a rear panel of a truck cab for holding a pair of gladhands (18,20) and an electric plug (22). The keeper is a one-piece unitary structure of molded plastic. It comprises a pair of gladhand receptacle members (32,33) and a plug receptacle member (34). The receptacle members are mounted on a panel of the cab by mounting brackets (24,26). The gladhand receptacle members (32,33) each defines a gladhand receptacle slot which receives a gladhand by insertion and rotation in a plane perpendicular to the mounting panel. The receptacle member (34) for the plug comprises a vertically disposed socket (50) between the pair of gladhand receptacle members (32,33).

10 Claims, 7 Drawing Figures

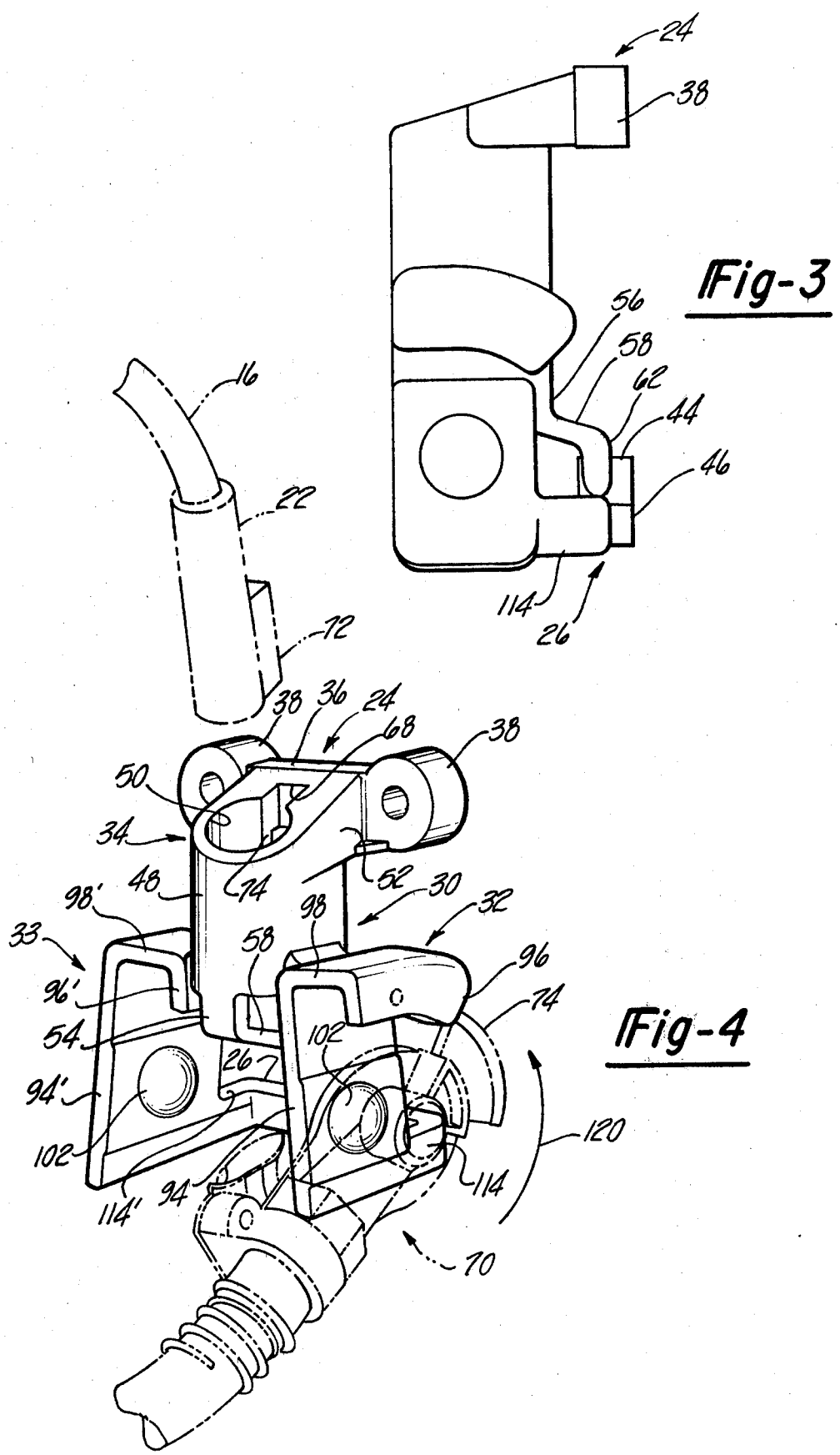

GLADHAND AND PLUG KEEPER FOR TRUCKS

FIELD OF THE INVENTION

This invention relates to trailer truck air brake hoses and electrical connectors which extend between the truck cab and trailer; more particularly, it relates to a holder or keeper for retaining air hose couplings and electric plugs on the rear of the cab when the trailer is disconnected.

BACKGROUND OF THE INVENTION

Trailer trucks are conventionally provided with air brakes on the trailer which require connection of air hoses from a pump on the truck cab extending to the brakes at the wheels of the trailer. Also, the electric lamps on the trailer are supplied through an electric cable from the battery in the cab. When the cab is disconnected from the trailer, the air hoses and the electric cable are disconnected from the trailer. For this purpose, each air hose extending from the cab terminates in a coupling unit, known as a gladhand, which mates with a fixed coupling unit, also a gladhand, on the trailer; the electric cable from the cab terminates in a plug which mates with a receptacle fixed to the trailer. When the cab is operated without the trailer, it is necessary to retain the air hose couplings and the electric plug on the rear of the cab so they will not be damaged and with an air tight seal on the air hose coupling.

Heretofore, it has been a common practice to mount a socket member on the rear of the cab for retaining the electric plug when it is disconnected from the trailer. The air hose glandhands present a more difficult problem; not only must the gladhand be held in place on the cab but also it must be sealed against the high pressure in the hose. The standard gladhand is adapted to serve as a quick disconnect coupling for the air brake hoses which carry high air pressure. For this puposse, the standard gladhand is constructed with a palm portion defining a circular air passage surrounded by an annular seal of rubber or other elastomeric material. It has an arcuate finger portion with a first cam surface on the backside and an arcuate heel portion with a second cam surface facing the palm portion and offset therefrom. The gladhand is adapted to be coupled with a complementary gladhand of the same construction by placing them plam-to-palm and rotating them in the plane of the palm so that the cam surface in the finger portion of one engages the cam surface in the heel portion of the other and vice versa. The rotational motion of the engaging cam surfaces causes the palm portions to be pressed tightly together with attendant compression of the elastomeric seals to produce an air tight coupling. Because of the need for maintaining an air tight seal during all operating conditions of the truck, the gladhands are designed so that a high value of torque is required for connecting and disconnecting a pair of gladhands. The air hose fitting is attached at the heel of the gladhand and serves as a handle for the operator in rotating the gladhand for connection and disconnection.

In the prior art, it is common practice to provide gladhand keepers on the rear of truck cabs. One known form of gladhand keeper is made of heavy gauge sheet steel in a one-piece construction. It comprises a generally flat body having a partially-spherical protrusion stamped therein to coact with the annular seal on the gladhand to provide an air tight connection. The body is provided with a pair of legs, each extending perpendicularly from the body and terminating in a foot which is adapted to be bolted onto the panel of the truck cab. A first tongue portion, having an inverted J-shape in cross-section, extends upwardly from the flat body to receive the finger portion of the gladhand. A second tongue portion extends downwardly from the flat body and is offset inwardly therefrom to be engaged by the cam surface of the heel portion of the gladhand. In this prior art, the gladhand is oriented relative to the keeper so that the palm of the gladhand is face-to-face with the flat body of the keeper. This requires the operator to rotate the gladhand in a plane parallel to the rear panel of the truck cab when the gladhand is connected and disconnected from the keeper.

The prior art gladhand keepers, such as that described above, are difficult and sometimes dangerous for the truck driver to use. The keeper for the pair of gladhands and the electric plug are separate and sometimes spaced from each other at relatively inaccessible locations. The gladhands require a forceful rotation in a plane parallel to the rear panel of the cab. The engagement of the rubber seal with the metal keeper results in large friction loading and requires a larger force to be exerted. Since a large force is required to connect the gladhand to the keeper and since the keeper is frequently installed in a hard-to-reach location, the driver often climbs onto the rear of the cab to connect or disconnect the gladhand. The effort of rotating the gladhand in the plane of the cab panel, especially under adverse weather conditions or the like, might result in loss of footing and injurious fall.

A general object of this invention is to provide a keeper for a pair of gladhands and an electric plug which overcomes the disadvantages of the prior art.

SUMMARY OF THE INVENTION

In accordance with the invention, a gladhand keeper is provided which permits the driver to connect and disconnect the gladhand from the keeper by a motion toward and away from the mounting panel of the cab. This is accomplished by a keeper body with a mounting means having a surface seated against the cab panel, a first member defining a gladhand receptacle slot extending toward said surface, and being spaced from the surface so that the gladhand may be inserted into the slot and rotated in a plane perpendicular to surface to interlock it with the member. Preferably, the keeper body comprises a pair of such members for retaining a pair of gladhands in side-by-side relation.

Further, in accordance with this invention, a combination keeper is provided as a single unit for keeping a pair of gladhands and an electric plug. This is accomplished by a single body having a pair of gladhand receptacle members and a plug receptacle member disposed above and between the gladhand receptacle members.

Further, in accordance with this invention, a combination gladhand and electric plug keeper comprises a unitary piece of molded plastic. The plastic material has properties of high tensile strength, stiffness and hardness. It exhibits low creep, high deflection temperature and flame resistance. The plastic has a waxy finish with an inherent lubricity which facilitates connecting and disconnecting the gladhand.

In a preferred embodiment, each of the gladhand receptacle members is of inverted J-shape and comprises a longer stem and a shorter stem connected together by a bar at the upper ends of the stems. The electric plug receptacle member defines a socket which opens upwardly and is disposed between the gladhand receptacle members. An upper mounting bracket is connected with the plug receptacle member and a lower mounting bracket extends between the gladhand receptacle members. Additionally, each of the gladhand receptacle members is provided with a partially-spherical protuberance to mate with the annular seal of the gladhands. Further, each of the gladhand receptacle members is provided with a detent element adapted to lock the gladhand in place.

A more complete understanding of this invention may be obtained from the detailed description that follows and the accompanying drawings.

DESCRIPTION OF THE DRAWINGS

FIG. 3 is a side view of the holder, as viewed from the right side in FIG. 2;

FIG. 4 is a perspective view showing the keeper with a gladhand and an electric plug;

BEST MODE FOR CARRYING OUT THE INVENTION

Figure 1:
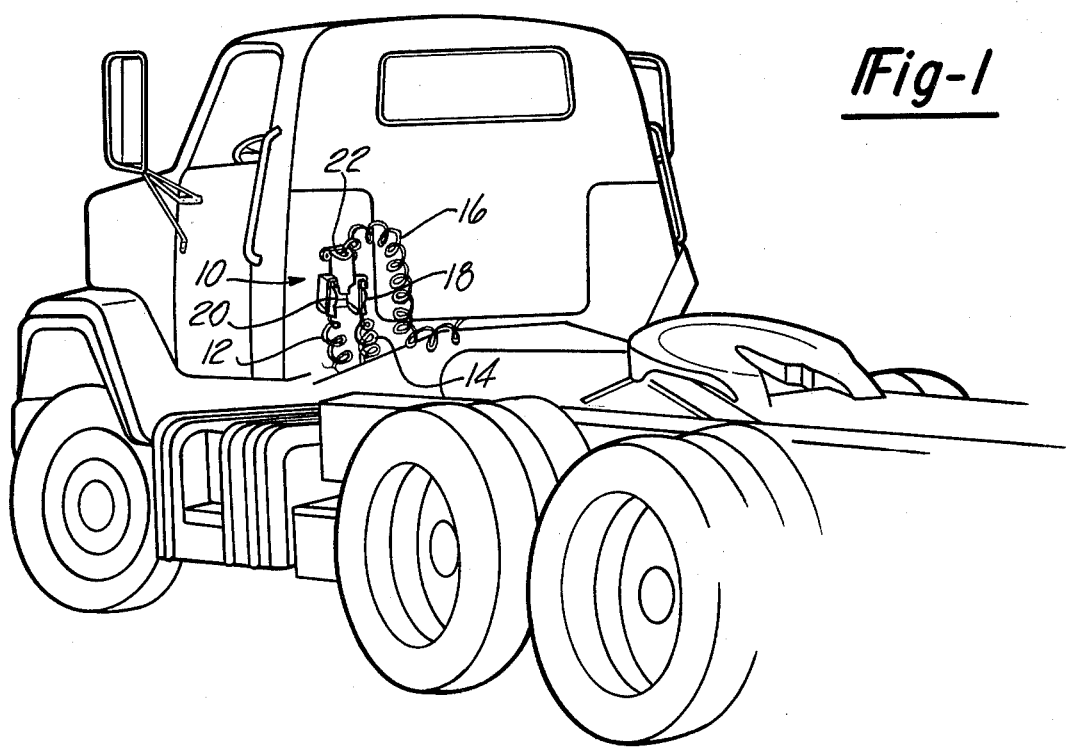
FIG. 1 shows the keeper of this invention installed on a truck cab.

Referring now to the drawings, there is shown an illustrative embodiment of the invention in a combination keeper for a pair of gladhands and an electric plug. The keeper is installed on the rear panel of a truck cab near the driver's side. It will be appreciated, as the description proceeds, that the invention may be practiced in the form of other embodiments and installation.

The keeper 10 of this invention is mounted on a rear panel of a cab of a semi-trailer truck. The cab is provided with a pair of air hoses 12 and 14 which carry high pressure air for the air brakes of the trailer. One of the air hoses, suitably hose 12, is used as the service supply line for the brakes and the other, hose 14, is used as an emergency supply line for the brakes. The cab is also provided with an electrical cable 16 for supplying power to the electric lamps on the trailer. The air hose 12 is terminated in a standard gladhand 18 and the hose 14 is terminated in a standard gladhand 20. The electric cable 16 is terminated in a conventional multi-conductor plug 22. In operation of the trailer truck, the gladhands 18 and 20 are coupled with corresponding gladhands which are fixedly mounted on the trailer and the plug 22 is connected with a mating receptacle mounted on the trailer. When the cab is disconnected from the trailer, the gladhands 18 and 20 and the plug 22 are held by the keeper 10 in a manner which secures them against damage and which seals the gladhands to prevent air leakage.

Figure 2:
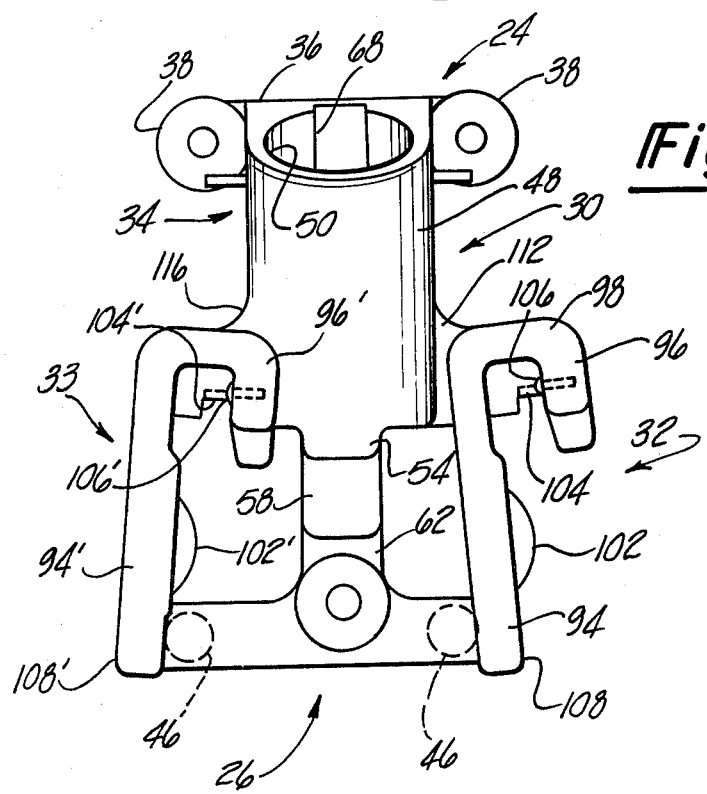
FIG. 2 shows an elevation view of the holder of this invention.

The general structure of the keeper will be described witth reference to FIGS. 2, 3, and 4. In general, the keeper comprises upper and lower mounting brackets 24 and 26 for mounting the keeper on the panel of the cab. The keeper comprises a body 30 including a first gladhand receptacle member 32 and a second gladhand receptacle member 33. It also includes an electric plug receptacle member 34. The mounting brackets and receptacle members of the body will be described in greater detail subsequently. The holder 10 is constructed of a unitary piece of plastic by injection molding. In the preferred embodiment, the keeper 10 is constructed of an alloy of ABS and PVC resins; specifically, it is sold under the trademark "Polyman 552" by A. Schulman Co., Inc. of Akron, Ohio. This material has a specific gravity equal to or greater than 1.18 grams per cubic centimeter, a hardness of Rockwell R 100 and a tensile strength of 6,000 psi. It has an impact Izod 120D equal to 8 foot pounds per inch, a deflection temperature of 264 psi annealed for sixteen hours at 195° F. and flexural modulus of 375,000 psi. Reverting now to FIGS. 2, 3, and 4, the structure of the keeper 10 will be described in detail. The upper mounting bracket 24 comprises a crossbar 36 which terminates at each end in a stand-off boss 38 which defines a passage for a mounting bolt. The lower mounting bracket 26 comprises a crossbar 42 which is provided with a stand-off boss 44 intermediate its ends. The boss 44 defines a passage for a mounting bolt. It is noted that the inner end surface of the boss 44 lies in the same plane as the inner end surfaces of the bosses 38. A pair of stand-off bosses 46 are disposed at opposite ends of the crossbar 42 and have inner end surfaces which terminate in the same plane as the inner end surfaces of bosses 38 and 44. Thus, the stand-off bosses provide mounting surfaces at the inner ends thereof which are adapted to be seated against a flat panel of the truck cab and to be secured thereto by bolts extending through the brackets into a suitable support structure behind the panel.

The body 30 includes the plug receptacle member 34 which is formed as a unitary structure with the mounting brackets 24 and 26. The member 34 includes a cylindrical section 48 which defines a socket 50 having a longitudinal axis adapted to be disposed vertically. The cylindrical portion 48 is provided with a head member 52 at its upper end. The head member 52 is integrally joined with the crossbar 36 and is provided with a downwardly sloping upper surface. The lower end of the cylindrical section 48 is supported by an integral, depending, outer strut 54 and an integral, depending inner strut 56. The lower ends of the struts 54 and 56 are supported by a diagonal strut 58 extending therebetween and terminating at its inner end in a support post 62 which is seated in the stand-off boss 44.

The socket 50 in the plug receptacle member 34 is adapted to receive the electric plug which terminates the electric cable 16. The socket 50 includes a keyway 68 which mates with the orienting key 72 on the plug 66. The keyway has a rear wall 74 at the upper end but it is an open slot at the lower end. The diameter of the cylindrical portion of the socket 50 is slightly larger than the diameter of the plug 22 so that the plug is received in a loose fit, enabling it to be readily removed under icing or other fouling conditions. The vertical disposition of the socket and sloping upper surface of the head facilitates insertion and removal of the plug. It is firmly retained in the socket against vibration and bumps by reason of the load and the twisting moment applied thereto by the overhanging electric cable. The use of the keyway 68, instead of an enlarged socket diameter, together with the open slot at the lower end of the keyway 68 minimizes the amount of material required for the keeper body. The lower end of the socket 50 is open and allows water drainage and avoids ice or snow build-up at the electrical terminals of the plug.

Figure 5:
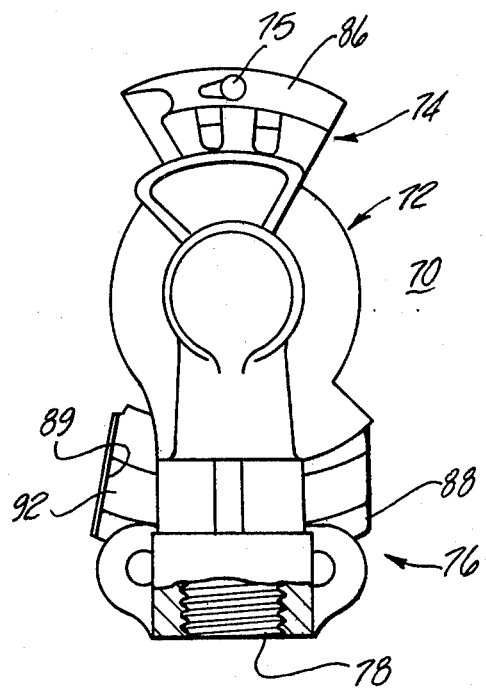
FIG. 5 is a view of a standard gladhand from the rear.
Figure 6:
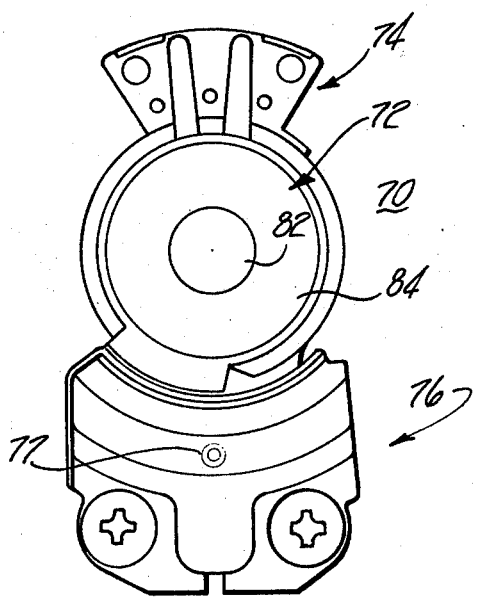
FIG. 6 is a view of the gladhand from the front.
Figure 7:
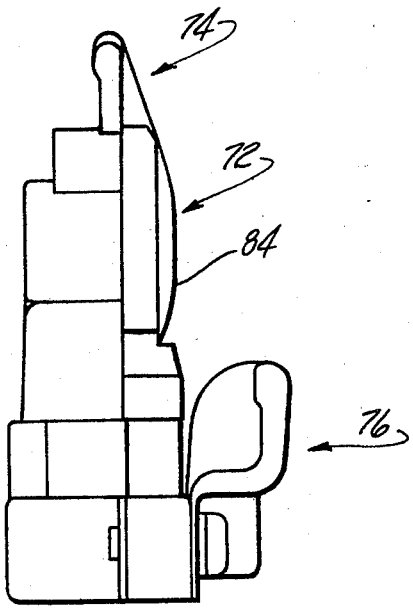
FIG. 7 is a side view of the gladhand.

Before proceeding with the detailed description of the gladhand receptacle members 32 and 33, it will be helpful to consider the structure of a standard gladhand, as shown in FIGS. 5, 6, and 7. The gladhand 70 is of such configuration that, in general, it resembles the shape of a person's hand. It includes a palm portion 72, a finger portion 74 and a heel portion 76. The gladhand is provided with an air passage 78 which is adapted to receive a threaded fitting of an air hose at the heel portion 76. An air passage extends through the gladhand and terminates in a circular opening 82 in the palm portion 72. The circular opening is surrounded by an annular elastomeric face seal 84 adapted to provide an air tight seal with a mating gladhand.

The finger portion 74 forms an arcuate shaped wedge; the back side thereof constitutes a first cam surface or finger cam 86 which is adapted to engage a heel cam, to be described, on a mating gladhand. The heel portion 76 of the gladhand is provided with a flange 88 which includes a second cam surface or heel cam 92 offset from and facing the palm portion 72. The flange 88 includes a stop abutment 89. The heel cam 92 is adapted to receive the finger cam of a mating gladhand. A detent recess 75 is provided on the cam surface 86 of the finger portion 74 and a detent element 77 is provided on the cam surface 92 of the heel portion 76. A pair of gladhand couplings are interconnected by placing them palm-to-palm with the seals aligned and rotating them so that the finger cam of one engages the heel cam of the other and vice versa. The seals of the gladhands serve as the center of rotation and when the gladhands are rotated into alignment with each other, the cam action is effective to press the seals together to form an air tight joint.

Now turning to FIGS. 2, 3, and 4, the structure of the gladhand receptacle members 32 and 33 will be described in detail. The receptacle member 32 is of inverted J-shape and comprises a longer stem 94 and a shorter stem 96, both extending substantially parallel to the axis of the socket 50 with the stems being joined at their upper ends by a transverse bar 98. The stems 94 and 96 define a receptacle slot therebetween for receiving a gladhand; the length of the slot extends substantially parallel to the axis of the socket 50 and the depth of the slot extends substantially perpendicular to the mounting surfaces of brackets 24 and 26. The longer stem 94 is provided with a land 102 near the midportion thereof, the land being a convex, partially-spherical protruberance from the plane of the longer stem. The land 102 is adapted to receive the annular elastomeric seal of the mating gladhand, as will be described below. The shorter stem 96 is provided with an entrance ramp 104 on the inner edge thereof to receive the leading edge of the finger portion of a mating gladhand, as will be described below. The shorter stem 96 is provided with a detent element 106 which is adapted to coact with the detent recess 75 on the mating gladhand. The lower end of the longer stem 94, at the outer edge 108 is adapted to receive the heel portion of the mating gladhand, in a manner that will be described below. The receptacle member 32 is connected at its upper end by a unitary junction 112 with the cylindrical portion of the receptacle member 34. The receptacle member 32 is connected at its lower end by a strut 114 to the end of the mounting bracket 26.

The gladhand receptacle member 33 is substantially identical in structure to the receptacle 32; to avoid repetition, corresponding parts thereof are designated by the same reference characters with a prime symbol added thereto. It is noted that the receptacle member 33 is oriented in the same way as member 32 but is disposed on the opposite side of the receptacle member 34 and is joined thereto by a unitary junction 116.

As described above, the plug receptacle member 34 defines a socket 50 with a longitudinal axis adapted to be disposed vertically. The gladhand receptacle member 32 and the receptacle member 34 include stems 94 and 94', respectively, which extends substantially parallel to the axis of the socket. The stem 94 and companion stem 96 define a receptacle slot which extends substantially parallel to the axis of the socket and similarly the stem 94' and companion stem 96' define a receptacle slot extending substantially parallel to the axis of the socket. In the preferred construction, and as shown in the drawings, the stem 94 and hence the slot of receptacle 32 is canted by approximately 5° relative to the axis of the socket 50 so that it diverges outwardly therefrom at its lower end. Similarly, the stem 94', and hence the slot of receptacle member 33, is canted approximately 5° relative to the axis of the socket 50 so that it diverges therefrom at the lower end. Thus, the slots of the receptacle members 32 and 33 are canted about 10° relative to each other so they are divergent. The purpose for this construction is to prevent snarling, interference and rubbing together of the coiled air hoses 12 and 14 when the gladhands are held in the keeper. These coiled air hoses form a cylinder of approximately five inches diameter which would interfere with each other if the receptacle members were parallel and vertical. This preferred construction, wherein the receptacle members 32 and 33 are canted in a divergent manner, provides for separation of the air hoses at the gladhand keeper.

The use of the keeper 10 of this invention will be described with reference to FIGS. 1 and 4. It is to be noted that the keeper is installed on the truck cab on a rear panel adjacent the driver's side. Preferably it is located so that the driver can reach it while standing on the ground and it is oriented so that the socket of the receptacle member 34 is vertically disposed and the receptacle slots of the receptacle members 32 and 33 open rearwardly of the mounting panel. When the driver disconnects the cab from the trailer, the electric plug 22 and the gladhands 18 and 20 are to be held in the keeper 10. For this purpose, the plug 22 is merely inserted into the socket 50 of the receptacle member 34 with the key of the plug aligned with the keyway of the socket. Each of the gladhands 18 and 20 is interlocked with the respective receptacle members 32 and 33. As illustrated in FIGS. 2 and 4, this is accomplished by placing the annular seal 84 of the gladhand against the land 102 of the receptacle member with the finger portion 74 of the gladhand at the entrance ramp 104 of the receptacle member. This orientation places the heel portion 76 of the gladhand adjacent the surface 108 of the receptacle member. The gladhand is rotated in the direction of the arrow 120 about the axis of the land 102 which serves as the center of rotation. This rotative motion causes the finger cam 86 on the finger portion 74 of the gladhand to engage the shorter stem 96 of the receptacle member and it causes the heel cam 92 on the heel portion of the gladhand to engage the longer stem 94 of the receptacle member. The camming action presses the elastomeric seal 84 of the gladhand against the land 102 and provides an air tight joint. When the gladhand is rotated to its fully seated position, with the stop abutment 89 of the heel portion 76 against the longer stem 94 of the receptacle member, the detent element 106 of the receptacle member is seated in the detent recess 75 in the finger portion of the gladhand.

It is noteworthy that the keeper 10 of this invention represents a significant improvement in safety to the driver. It is adapted for location where it is easy for the driver to reach from the ground, with the receptacle members for both gladhands and the plug being combined in a single keeper. Importantly, the motion required of the driver for connecting and disconnecting the gladhand from the keeper is perpendicular to the mounting panel instead of parallel to it. This facilitates the exertion of the thrusting and pulling forces required and greatly reduces the hazard in the event of a loss of footing or an unwanted separation of the gladhand from the holder. The amount of force required is reduced by the use of the plastic construction of the keeper since the plastic has an inherent lubricity which greatly reduces the friction loading, especially at the elastomeric seal, as compared with a metal keeper structure. A positive interlock of the gladhand and keeper is assured, in spite of the reduced frictional loading, by the detent. Accordingly, the keeper of this invention is safer, more effective and easier to use for the driver. Further, it is of low cost construction and simple to install on the truck cab.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A gladhand keeper for mounting on a vertical panel of a truck cab having at least one air hose terminating in a first gladhand, said gladhand being of the type having a heel portion, a palm portion, and a finger portion, a fitting for an air hose at the heel portion with an air passage extending to an opening in the palm portion, said opening being surrounded by an annular seal, a first flange on the finger portion and a second flange on the heel portion, the first and second flanges being on opposite sides of said opening, said keeper comprising, mounting means defining a surface adapted to be seated against said panel,
   a body connected with the mounting means,
   said body having a first J-shaped receptacle member with a longer stem and a shorter stem connected by a transverse bar and defining a gladhand receptacle slot,
   the inner wall of said longer stem being adapted to receive the annular seal of the gladhand with the first flange being disposed between the stems and the second flange being disposed outside the longer stem,
   said slot having a length extending substantially parallel to said surface of the mounting means and having a depth extending substantially perpendicular to said surface,
   said inner wall of said longer stem being substantially perpendicular to said surface of the mounting means,
   whereby said gladhand may be inserted into said receptacle slot and rotated in a plane substantially perpendicular to said surface to interlock it with the first receptacle member.

2. The invention as defined in claim 1 wherein said truck cab has a second air hose terminating in a second gladhand and wherein,
   said body has a second receptacle member of the same structure as the first receptacle member,
   said first and second receptacle members being disposed side-by-side,
   whereby first and second gladhands may be inserted into respective receptacle slots and rotated in a plane substantially perpendicular to said surface to interlock the gladhands with the respective receptacle members.

3. The invention as defined in claim 2 wherein said truck cab has an electric cable terminating in an electric plug, and wherein,
   said body has a third receptacle member defining a socket adapted to receive said electric plug.

4. The invention as defined in claim 3 wherein said keeper is constructed of a unitary piece of plastic.

5. The invention as defined in claim 4 wherein,
   said third receptacle member defines a socket having a longitudinal axis adapted to be oriented vertically,
   and said first and second receptacle members are disposed on opposite sides of said third receptacle member with the length of said slots and said inner wall of the longer stems extending substantially parallel to said axis of the socket.

6. The invention as defined in claim 5 wherein the slots of the first and second receptacle members are canted about 10° relative to each other so as to be divergent at their lower ends.

7. The invention as defined in claim 5 wherein,
   said mounting means comprises an upper bracket and a lower bracket,
   said third receptacle member being connected between said upper bracket and said lower bracket,
   the upper ends of said first and second receptacle members being connected with said third receptacle member and the lower ends of said first and second receptacle members being connected with said lower bracket.

8. The invention as defined in claim 7 wherein each of said gladhands is of the type in which the first arcuate flange has a first cam surface on the back of the finger portion offset from the palm portion, and the second arcuate flange has a second cam surface facing and offset from the palm portion and wherein,
   said longer stem of each of said first and second members includes a circular convex land adapted to receive said annular seal in sealing engagement and to constitute a center of rotation in the motion required for interconnecting the gladhand with the respective gladhand receptacle member,
   the center of said land on each of said first and second members is spaced outwardly from said mounting surface by a distance greater than the spacing between the center of said seal and the end of the finger portion of said gladhand,
   whereby said finger portion of the respective gladhand is adapted to enter the receptacle slot from the rear with said first cam surface in engagement with said shorter stem and said heel portion of the gladhand is adapted to enter said slot from the front with said second cam surface in engagement with said longer stem.

9. The invention as defined in claim 8 wherein each of said gladhands includes a detent recess on the backside of said finger portion, and wherein,
   each of the shorter stems of said first and second receptacle members includes a detent element adapted to coact with the respective detent recess.

10. The invention as defined in claim 4 or 8 wherein said plastic is an alloy of ABS and PVC resins.

* * * * *